(12) United States Patent
Lantry et al.

(10) Patent No.: US 7,647,135 B2
(45) Date of Patent: *Jan. 12, 2010

(54) ROBOTIC DATA STORAGE LIBRARY COMPRISING A VIRTUAL PORT

(75) Inventors: Mark L. Lantry, Fort Collins, CO (US);
Matthew T. Starr, Lafayette, CO (US);
Larry A. Fenske, Loveland, CO (US);
Michael G. Goberis, Broomfield, CO (US); Joshua D. Carter, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 854 days.

This patent is subject to a terminal disclaimer.

(21) Appl. No.: 11/194,264

(22) Filed: Aug. 1, 2005

(65) Prior Publication Data

US 2005/0267627 A1    Dec. 1, 2005

Related U.S. Application Data

(63) Continuation of application No. 10/604,970, filed on Aug. 28, 2003, now Pat. No. 7,010,387.

(51) Int. Cl.
*G06F 7/00* (2006.01)
(52) U.S. Cl. ................................. 700/214; 700/213
(58) Field of Classification Search ............... 700/213, 700/214
See application file for complete search history.

(56) References Cited

U.S. PATENT DOCUMENTS 5,459,848 A    10/1995    Mase
5,548,521 A    8/1996    Krayer et al.
5,768,141 A *  6/1998    Hanaoka et al. ............. 700/214

(Continued)

FOREIGN PATENT DOCUMENTS

WO    WO 2005/010661 A2    2/2005

(Continued)

OTHER PUBLICATIONS

U.S. Appl. No. 10/950,613, Starr et al.

(Continued)

*Primary Examiner*—Gene Crawford
*Assistant Examiner*—Ramya Prakasam
(74) *Attorney, Agent, or Firm*—Kenneth Altshuler

(57) ABSTRACT

A robotic data storage library comprising a virtual port and a method for providing a virtual port for a robotic data storage library are disclosed. The virtual exit port, for example, comprises one or more storage locations of the library that are defined as a virtual port. In one embodiment, for example, the virtual port comprises a virtual exit port for holding a data storage element that is to be exported from the library. In this embodiment, for example, the virtual exit port is defined prior to the library receiving a command to export a data storage element. In another embodiment, the virtual port comprises an entry port, an exit port or an entry/exit port. In yet another embodiment, a method for transferring a data storage element directly between an actual port (entry and/or exit) of a robotic data storage library and another location within the robotic data storage library not defined as the virtual port is disclosed.

21 Claims, 13 Drawing Sheets

U.S. PATENT DOCUMENTS

| | | |
|---|---|---|
| 6,338,006 B1 | 1/2002 | Jesionowski et al. |
| 6,604,165 B1 | 8/2003 | Terao |
| 6,738,688 B2 * | 5/2004 | Im .............................. 700/214 |
| 2004/0105187 A1 | 6/2004 | Woodruff et al. |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0013149 A1 | 1/2005 | Trossell |
| 2005/0043852 A1 | 2/2005 | Gallo et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |

FOREIGN PATENT DOCUMENTS

| | | |
|---|---|---|
| WO | PCT/US2005/045168 | 12/2005 |
| WO | PCT/US2005/046447 | 12/2005 |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

ROBOTIC DATA STORAGE LIBRARY COMPRISING A VIRTUAL PORT

CROSS-REFERENCE TO RELATED APPLICATIONS

This application is a continuation of U.S. Ser. No. 10/604,970, filed Aug. 28, 2003 which is incorporated herein by reference.

FIELD OF THE INVENTION

The present invention is directed to a robotic data storage library and, more specifically, a robotic data storage comprising a virtual port for receiving a data storage element.

BACKGROUND

Presently, robotic data storage libraries are primarily used to archive data, i.e., store data that is not immediately needed by a host computer, and provide archived data to the host computer when the data is needed. A typical robotic data storage library receives data from a host computer and writes the data to a recording medium of a data storage element. When the host computer requires some of the data that was previously written to a data storage element, a request for the data is sent from the host computer to the library. In response, the library locates the data storage element, reads the data from the data storage element, and transmits the data to the host computer system. Most robotic data storage libraries are currently comprised of: (a) a plurality of storage locations for holding the data storage elements; (b) a data transfer interface capable of establishing a communication path with a data storage element so that data can be transferred between the data storage element and the host computer; (c) an entry/exit port for transferring a data storage element into and out of the library; and (d) a transport unit for moving a data storage element between locations within the library and the entry/exit port.

One example of a robotic data storage library is a tape cartridge library. In a tape cartridge library, for example, the library comprises a plurality of shelf structures comprising slots for holding tape cartridges, a drive for writing data to and/or reading data from the tape housed in the tape cartridges and a robot for transporting the tape cartridges between the storage slots and the tape drive. When a host computer provides data for archival purposes to the tape cartridge library, the robot retrieves a tape cartridge from a storage slot and transports the tape cartridge to a drive. The drive writes the data onto the tape in the tape cartridge. When the drive has completed writing the data onto the tape, the robot retrieves the tape cartridge from the drive and places the tape cartridge into a storage slot for later access.

When the host computer requests the archived data, the tape cartridge library locates the tape cartridge. The robot retrieves the tape cartridge from a storage location and transports the tape cartridge to a drive. The drive reads the data from the tape in the tape cartridge and provides the data to the host computer. After the data has been read from the tape in the tape cartridge, the robot retrieves the tape cartridge from the drive and transports the tape cartridge to a storage slot.

When a tape cartridge is exported from the library, the robot retrieves the tape cartridge and transports the tape cartridge to the entry/exit port for removal from the library. Conversely, when a tape cartridge is imported into the library, the robot retrieves the tape cartridge from the entry/exit port and transports the tape cartridge to a location within the library.

During operation, the host computer typically maintains an inventory of the library that identifies items within the library (e.g., tape cartridges) and the locations of the items within the library. The host computer needs the inventory so that the host can issue instructions to the library relating to the items identified in the inventory. So, for example, an inventory may include the identity and the storage location of a particular tape cartridge. With this inventory, the host computer is able to issue a command to instruct the library to move the tape cartridge from the storage location to the drive.

SUMMARY OF THE INVENTION

An exit port of a robotic data storage library provides a bottleneck when a data storage element is exported from the library. If the exit port is filled up, it prevents later moves from being performed until the exit port is cleared. During an export operation, a host computer typically directs a data storage element to be moved directly to the exit port for removal from the library. If an operator is not present to remove a data storage element as it reaches the exit port, the port may fill up and result in moves not being performed until the operator empties the locations of the exit port. After the operator clears the exit port, an unfinished move can be performed while the operator waits for the transport unit to deliver the data storage element to the exit port.

In a previous attempt to solve the bottleneck problem associated with an exit port of a robotic data storage library, a library has been provided in which a data storage element to be exported is not moved until an operator is present and requests the data storage element to be delivered to the data storage element. In this library, the storage location in which the data storage element resides is first marked as unusable. Then, when an operator is present, the operator can request that a data storage element residing in a storage location that has been marked as unusable, and the library delivers the data storage element at that time. The data storage element, however, can be located anywhere within the library, and once the operator requests the data storage element, the operator may have to wait while the transport unit retrieves the data storage element and delivers it to the exit port.

One embodiment of the present invention, however, provides a virtual exit port for holding a data storage element that is to be exported from the library. The virtual exit port, for example, comprises one or more storage locations of the library that are defined as a virtual exit port prior to the library receiving a command to export the data storage element. By defining a storage location as a virtual exit port prior to receiving a command to export the data storage element, the virtual exit port may comprise storage locations located in a preferred location of the library. In one embodiment, for example, the storage locations defined as the virtual exit port are located in the library such that the time to deliver a data storage element from the virtual exit port to the actual exit port is reduced. Thus, when the operator requests that a data storage element be delivered to the actual exit port, the data storage element is already located in a virtual exit port, which is located closer to the actual exit port instead of possibly located in a storage location anywhere in the library.

In one embodiment, a method for providing a virtual exit port for a robotic data storage library is provided comprising: (a) providing a robotic data storage library comprising: (i) a plurality of storage locations, each capable of holding at least one data storage element, (ii) a data transfer interface for receiving a data storage element and establishing a communication path with a data storage element so that data can be transferred between the data storage element and a host computer, (iii) an actual exit port for transferring a data storage element out of the library, and (iv) a transport unit for moving a data storage element between a location within the library and the actual exit port; and (b) defining at least one of the plurality of storage locations as a virtual exit port prior to receiving a command to export a data storage element from the library.

In another embodiment, a storage location of the library defined as a virtual exit port is used during export operations of the library. As described above, for example, the virtual exit port is used to hold a data storage element to be exported from the library so as to prevent the actual exit port from providing a bottleneck. In one embodiment, a data storage element is moved from a location of the library to the virtual exit port. In another embodiment, once a data storage element has been delivered to the virtual exit port, the data storage element is also moved from the virtual exit port to the actual exit port for removal. This move may, for example, be initiated at a time when the actual exit port is free or when an operator is ready to remove the data storage element from the actual exit port.

For example, one embodiment of a method for providing a virtual exit port for a robotic data storage library comprises: (a) providing a robotic data storage library comprising: (i) a plurality of storage locations, each capable of holding at least one data storage element, (ii) a data transfer interface for receiving a data storage element and establishing a communication path with a data storage element so that data can be transferred between the data storage element and a host computer, (iii) an actual exit port for transferring a data storage element out of the library, and (iv) a transport unit for moving a data storage element between a location within the library and the actual exit port; (b) defining at least one of the plurality of storage locations as a virtual exit port prior to receiving a command to export a data storage element from the library; (c) moving a data storage element from one of the plurality of storage locations to the virtual exit port; and (d) moving a data storage element from the virtual exit port to the actual exit port.

In another embodiment, a data storage element is also moved directly from a location within the library to the actual exit port when desired. If a data storage element is to be exported from the library, such as when an operator is present at the library, for example, the data storage element is retrieved from a location in the library and moved directly to the actual exit port. In this manner, the data storage element is exported directly to the actual exit port without first being delivered to the virtual exit port.

The method, in another embodiment, defines a virtual exit port comprising at least one storage location in a preferred location. In a magazine-based library embodiment, for example, the method defines a virtual exit port comprising a plurality of slots in a magazine. In this manner, data storage elements delivered to the virtual exit port are collected in a single magazine and later rapidly exported by delivering the entire magazine to the actual exit port in a single move. In another embodiment, the method defines a storage location located substantially adjacent to the actual exit port as a virtual exit port. Alternatively, the method defines a storage location located nearer to the actual exit port than at least one other storage location of the library as a virtual exit port. In another embodiment, the method defines a virtual exit port comprising a plurality of contiguous storage locations.

A data storage library comprising a storage location defined as a virtual exit port is also provided. In one embodiment, for example, a robotic data storage library comprises: (a) a plurality of storage locations, each capable of holding at least one data storage element; (b) a data transfer interface for receiving a data storage element and establishing a communication path with a data storage element so that data can be transferred between the data storage element and a host computer; (c) an actual exit port for transferring a data storage element out of the library; (d) a transport unit for moving a data storage element between a location of the library and the actual exit port; and (e) a controller for receiving a command to eject a data storage element from the library and for causing at least one of the storage locations to be defined as a virtual exit port prior to receiving a command to eject a data storage element from the library.

In another embodiment, the controller of the robotic data storage library is further adapted to direct the export of a data storage element from the library. The controller, for example, directs the transport unit to move the data storage element from a location within the library to the virtual exit port. The controller, in another embodiment, is adapted to direct the transport unit to move a data storage element from the virtual exit port to the actual exit port. In yet another embodiment, the controller is further adapted to direct the transport unit to move a data storage element directly from a storage location to the actual exit port. In one embodiment, for example, the controller also comprises a user interface for receiving a command to move a data storage element.

In another embodiment, a method for transferring a data storage element directly between an actual port (entry and/or exit) of a robotic data storage library and another location within the robotic data storage library not defined as the virtual port is provided. In some instances, it is desirable to move a data storage element directly between an actual port and another location of the library without first moving the data storage element to a virtual port. For example, one embodiment of the method moves a data storage element directly between an actual port and another location of the library when an operator is present at the actual port of the library. In one embodiment, a method for transferring a data storage element directly between an actual port of a robotic data storage library and another location of the library comprises: (a) providing a robotic data storage library comprising: (i) a plurality of storage locations, each capable of holding at least one data storage element, (ii) a data transfer interface for receiving a data storage element and establishing a communication path with a data storage element so that data can be transferred between the data storage element and a host computer, (iii) an actual port for transferring a data storage element between the library and an external environment, and (iv) a transport unit for moving a data storage element between a location within the library and the actual port; (b) defining at least one of the plurality of storage locations as a virtual port; (c) mapping the virtual port to a host computer such that the host computer perceives the virtual port to be an actual port of the library; and (d) moving a data storage element directly between the actual port and a location within the library not defined as the virtual port.

DETAILED DESCRIPTION

Figure 1:
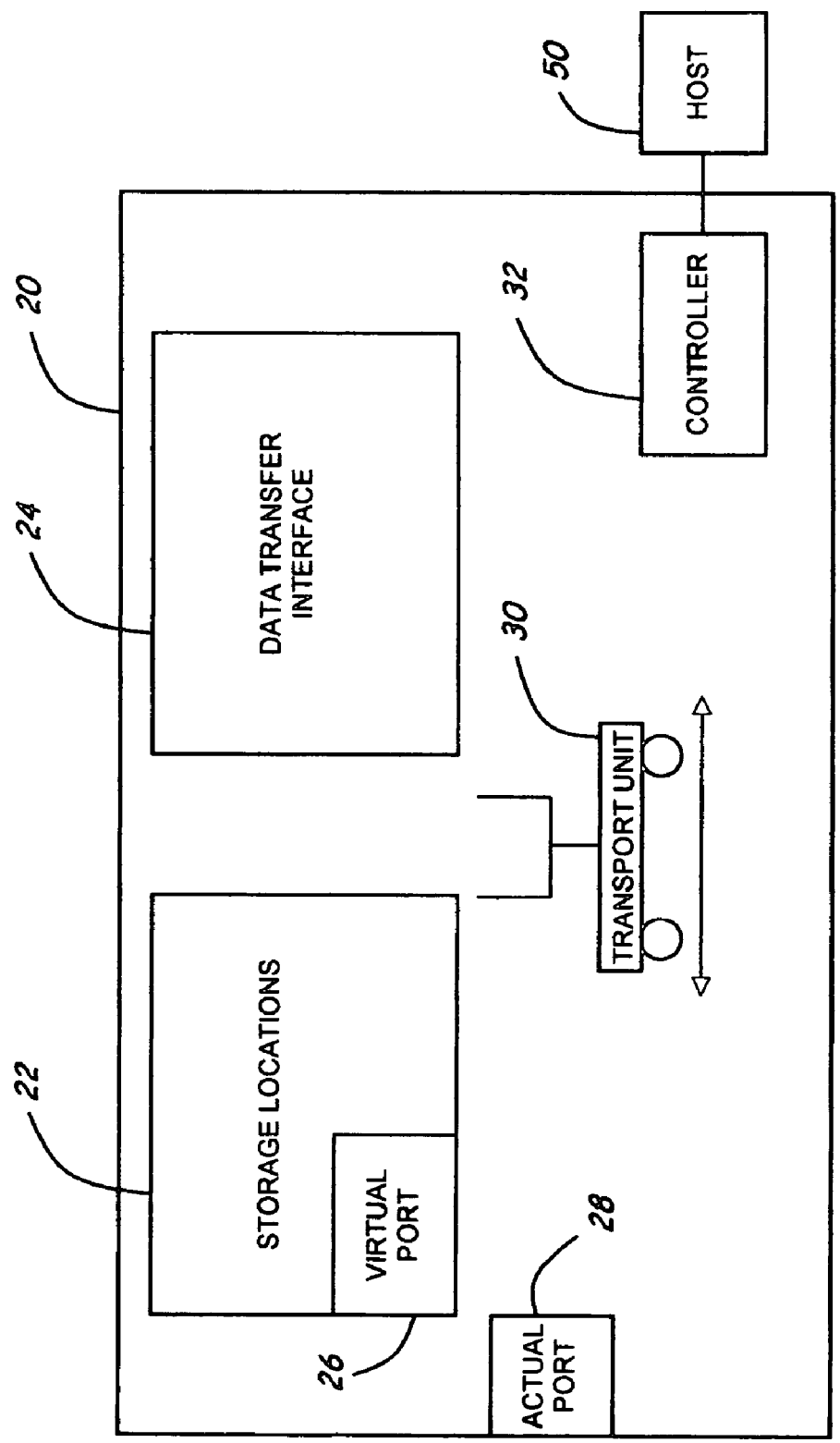
FIG. 1 shows a block diagram of a first embodiment of a robotic data storage library.

FIG. 1 shows a block diagram of a robotic data storage library 20. The robotic data storage library 20 comprises a plurality of storage locations 22, a data transfer interface 24, a virtual port 26, an actual port 28, a transport unit 30 and a controller 32.

The plurality of storage locations 22 comprises any location capable of holding at least one data storage element when it is not in communication with a data transfer interface 24 or it is not residing at the actual port 28 or at the transport unit 30. A data storage element may comprise any type of media on which data may be written to and/or read from by a data transfer interface 24 installed in a robotic data storage library 20. A data storage element, for example, may comprise a tape, a tape cartridge, a tape pack, a tape drive, a tape drive pack, a disk, a disk cartridge, a disk pack, a disk drive, a disk drive pack, a memory stick, a memory card, or any other data storage device for which a data transfer interface 24 may write data to and/or read data from. A storage location 22 may be fixed or movable and be adapted to hold one or more data storage elements. For example, a storage location 22 may comprise a support structure sized and shaped to hold a single data storage element or to hold a plurality of data storage elements. The support structure may comprise, for example, a shelf, a slot, a rail, a clip, a drawer, a moveable magazine, or a structure, such as a shelf, a slot, a rail, a clip or a drawer, within a moveable magazine for holding at least one data storage element. In one embodiment, a storage location may hold another storage location, which in turn holds a data storage element. In a magazine-based robotic data storage library, for example, a storage location 22 may comprise a structure, such as a shelf, for supporting a movable magazine, which in turn comprises a plurality of storage locations 22 that can hold one or more data storage elements.

The plurality of storage locations 22 may also be partitioned to comprise two or more individual partitions of storage locations 22. Each of the partitions may comprise a physical address and a logical address. One or more host computers 50 may see the partitions as independent robotic data storage libraries by their logical addresses although they are packaged together in one physical robotic data storage library 20.

The data transfer interface 24 receives a data storage element and establishes a communication path with the data storage element so that data can be transferred between the data storage element and a host computer. The data transfer interface 24, for example, may comprise a drive, such as a tape or disk drive for receiving a data storage element, or may comprise an interface port to which a data storage element, such as a tape or disk drive or drive pack, may be connected to establish a communication path with the storage medium of the data storage element.

The actual port 28 allows one or more data storage elements to be imported into and/or exported from the library 20. The actual port 28 may comprise an entry port for importing data storage elements into the library 20, an exit port for exporting data storage elements out of the library 20 or an entry/exit port for importing data storage elements into and exporting data storage elements from the library 20. The actual port 28, for example, may include a door in the library that allows an operator to open the door and access the interior of the library so that one or more data storage elements may be imported into and/or exported from the library 20. In other embodiments, the actual port 28 may comprise a device that allows a data storage element to be imported into and/or exported from the library 20 without exposing an operator to the transport unit 30. In these instances, one or more data storage elements may be imported into or exported from the library 20 without powering down the library or disabling the transport unit 30. An entry/exit port that may be used in the robotic data storage library 20, for example, may allow an operator to import a data storage element into the library and export a data storage element from the library without being exposed to the transport unit 30. Because the operator is not exposed to the transport unit 30, the library does not need to be powered down or the transport unit 30 disabled during the import or export operation.

An entry/exit port, for example, may comprise a location, such as a slot, for holding a data storage element and a device that places the slot in one of two states. In the first state, the slot of the port is exposed to the environment exterior to the library such that the slot is accessible from outside the library. When the slot is in the first state, the exit/entry port substantially prevents an operator from accessing the interior of the library by way of the slot and, as a consequence, prevents the operator from being exposed to injury by the transport unit 30. In the second state, the slot of the entry/exit port is exposed to the interior of the library such that the transport unit 30 is able to access the slot. When the slot is in the second state, the entry/exit port prevents an operator from accessing the interior of the library via the slot. For importing a data storage element into the library, the slot is placed in the first state and a data storage element is inserted into the slot. The slot is then placed in the second state to make the data storage element available to the transport unit for placement elsewhere in the library. For exporting a data storage element, the slot is placed in the second state and the transport unit places a data storage element in the slot. The slot is then placed in the first state to make the data storage element available for removal.

An actual port 28 may also comprise a port that provides the ability to insert multiple data storage elements en masse into a library and extract multiple data storage elements en masse from the library. An entry/exit port, for example, may allow importing and/or exporting several data storage elements at a time by providing multiple slots that form a fixed part of the port. Alternatively, an entry/exit port may allow a magazine with multiple slots to be inserted into the port. With respect to this type of entry/exit port, importing multiple data storage elements into the library may be accomplished by placing the port in a first state so that either: (a) a magazine that is already present in the port is populated with multiple data storage elements, or (b) a magazine and accompanying data storage elements are placed into the port. The port is then placed in a second state so that the transport unit can either: (a) individually move each of the data storage elements in the magazine to other locations within the library, or (b) move the magazine to another location within the library. To export multiple data storage elements, the port is placed in the second state and the transport unit either: (a) individually moves data storage elements from various locations in the library to a magazine already located in the port, or (b) moves a magazine and accompanying data storage elements to the port. The port is then placed in the first state. Once in the first state, individual data storage elements may be removed from the magazine or the magazine may be removed from the port.

The transport unit 30 comprises an assembly for moving at least one data storage element between a location within the library 20 and the actual port 28. The transport unit 30 may, for example, move a data storage element between a storage location 22 and the actual port 28, between a virtual port 26 and the actual port 28 or between a data transfer interface 24 and the actual port 28. The transport unit 30 may also move a data storage element between other locations within the library 20. For example, the transport unit 30 may move a data storage element between a storage location 22, a data transfer interface 24 and a virtual port 26 of the robotic data storage library 20. The transport unit 30, for example, may comprise a robot for moving one or more data storage elements. In a cartridge-based library, for example, the transport unit 30 may comprise a robot comprising a cartridge picker for grasping a cartridge and moving the cartridge within the library 20. In a magazine-based cartridge library, however, the transport unit 30 may not only comprise a robot or other unit for grasping and moving a cartridge between locations within the library 20, but may further comprise a magazine picker for grasping and moving a magazine to and from a storage location 22.

The controller 32 can communicate with a host computer 50. The controller 28 can also control the operation of one or more components of the library 20, such as the data transfer interface 24, the virtual port 26, the actual port 28 and/or the transport unit 30. The controller 32 can also perform operations within the library 20 under the direction of a host computer 50 and can provide information regarding the library 20 to the host computer 50.

The virtual port 26 comprises one or more storage locations 22 defined as one or more virtual ports 26. The virtual port 26 may, for example, comprise one or more storage locations 22 located in a preferred location of the library 22. In a magazine-based library, for example, the virtual port 26 may comprise a plurality of slots located in a magazine. In this embodiment, a move of multiple data storage elements located in a single magazine defined as a virtual port 26 to the actual port 28 may be performed rapidly by moving the entire magazine to the actual port 28 instead of having to retrieve and move individual data storage elements from various magazines of the library 20. In another embodiment, the virtual port may comprise a plurality of contiguous storage locations for holding data storage elements to be removed from the library 20. The data storage elements waiting to be removed from the library are thus located in a common location of the library 20. Where this common location is identifiable to an operator, such as on the inside of a door of the library, for example, an operator may quickly identify and remove the desired data storage elements manually from the door of the library. The virtual port may also comprise one or more storage locations 22 located physically near the actual port 28 of the library 20. In this manner, the later moves to remove the desired data storage elements may be accomplished by short-distance moves by the transport unit 30. In one embodiment, for example, the virtual port 26 may comprise one or more storage locations 22 located substantially adjacent to the actual port 28 of the library 20 so that an unloading operation is performed with minimal-distance moves by the transport unit 30 of the library.

Figure 2:
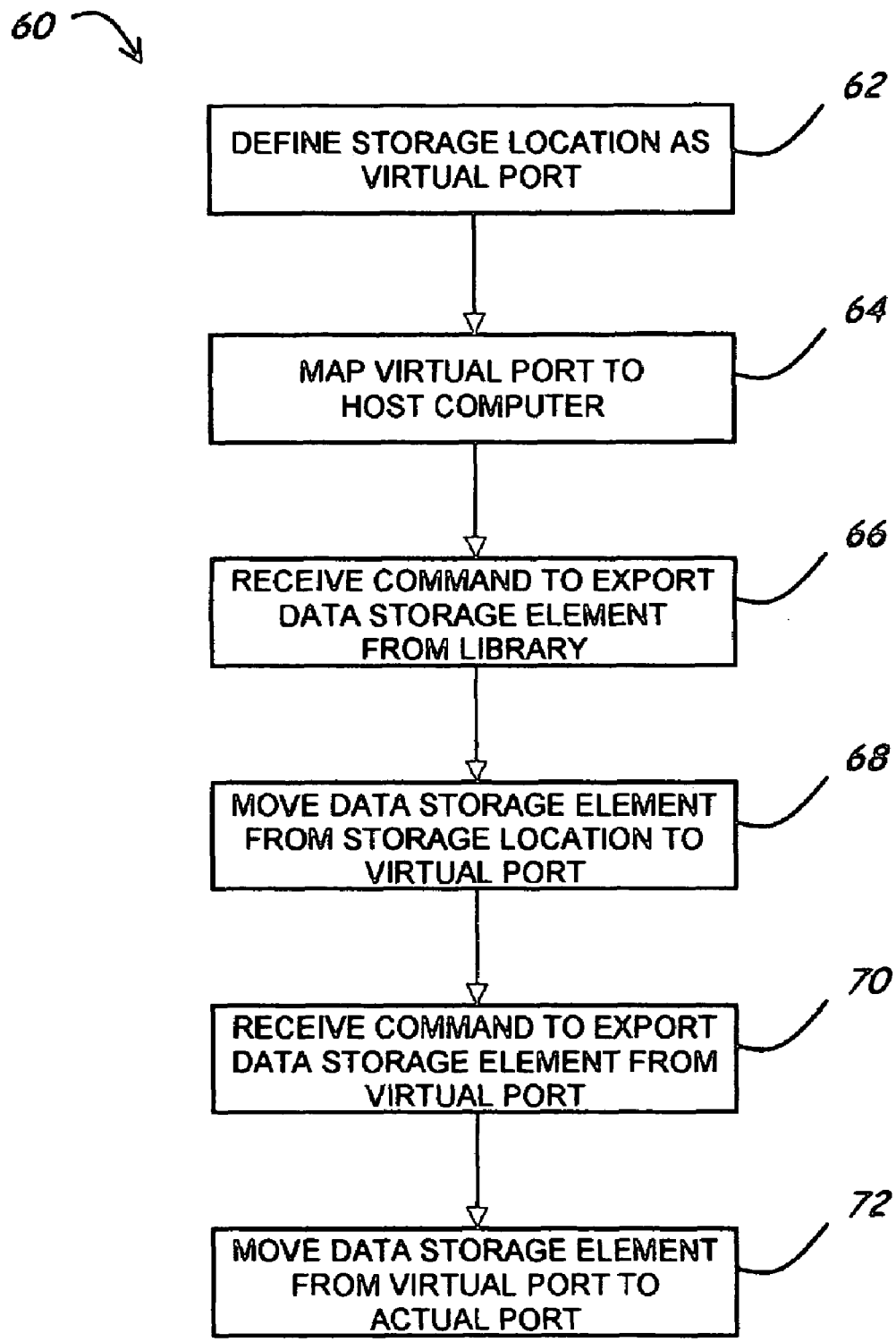
FIG. 2 shows a flow diagram of a method for exporting a data storage element from a robotic data storage library.

FIG. 2 shows a flow diagram of a method 60 for exporting a data storage element from a robotic data storage library 20. In the method 60, one or more storage locations 22 are defined as a virtual port 26 of the library 20 in operation 62. One or more storage locations 22 may be defined as a virtual port 26 by identifying a number of storage locations 22 and the address(es) of the storage locations 22. The address(es), for example, may be identified by physical addresses and/or logical addresses. In an embodiment in which a contiguous (physically or logically) block of storage locations is defined as the virtual port 26, for example, the designation may comprise a number of storage locations starting at a particular address.

In one embodiment, the storage locations 22 may be defined by an operator assigning a number of storage locations 22 and the addresses of the storage locations 22 to be assigned to the virtual port 26. The operator may assign the number and/or addresses of the storage locations, for example, at a control panel of the library during a configuration step for the library. Thus, the controller 32 may receive the designation of the number and/or addresses of the storage locations 22 to be assigned to the virtual port 26 via an input from a control panel. The operator may also designate a number and addresses of storage locations 22 to be assigned to the virtual port 26 via software running on the host computer 50, software running on another computer in communication with the library via a network, software running on the controller, and/or via any other input to the controller 32 or the host computer 50.

Alternatively, the number of storage locations assigned to the virtual port 26 may be assigned a default number and/or addresses of storage locations 22. If an operator does not define the number and/or addresses of the one or more storage locations to be defined as the virtual port 26, for example, the controller or the host controller may define a default number and/or addresses of storage locations 22 as the virtual port 26.

The virtual port 26 may optionally be mapped to the host computer 50 in operation 64 so that the host computer perceives the address(es) of the virtual port as an actual port. Where the host computer 50 directs the movement of data storage elements within the library, the host perceives the virtual port 26 as an actual port of the library 20. Thus, when the host issues a command directing the transport unit 30 to export a data storage library (should be element) from the library 20, the transport unit 30 initially moves the data storage element to the virtual port 26, where it is held until a later command is received to move the data storage element from the virtual port 26 to the actual port 28. In one embodiment, for example, a controller 32 communicating with a host computer 50 using a Small Computer System Interface (SCSI) standard, may use IE elements normally assigned to an actual port to map the virtual port to the host computer.

A command to export a data storage element from the library 20 is received in operation 66. The command may be received, for example, by the controller 32 from the host computer 50. The command may also be received from an operator such as via a control panel, software running on the host computer 50, software running on a computer in communication with the controller, such as via a network, or via any other input of the controller.

In response to the command received in operation 66, the transport unit 30 moves the data storage element to the virtual port 26 in operation 68. The data storage element may be moved to the virtual port from any location within the library 20, such as from a storage location 22, from a data transfer interface 24 or from a location residing on the transport unit. In one embodiment, for example, the transport unit may move to a location such as a storage location 22 or a data transfer interface 24, retrieve the data storage element from the storage location 22 or the data transfer interface 24, move to the location of a virtual port 26 and deliver the data storage element to the virtual port 26.

A command to export a data storage element from the virtual port 26 is received in operation 70. The command may be received, for example, by the controller 32 from an operator such as via a control panel, software running on the host computer 50, software running on a computer in communication with the controller via a network, or via any other input of the controller. The host computer 50 may also receive the command from an operator such as via software running on the host computer 50, from a computer in communication with the host computer 50 via a network, via a control panel, via the controller 32 or via any other input of the host computer 50. Alternatively, the command may be generated by the controller 32, the host computer 50 or a computer in communication with the controller 32 or the host computer 50, such as via a network. For example, the command may be automatically generated when the virtual port 26 is detected as full to open up one or more locations of the virtual port 26 by transferring one or more data storage elements to the actual port 28 for removal.

In response to the command received in operation 70, the transport unit 30 moves the data storage element from the virtual port 26 to the actual port 28 in operation 72. The transport unit, for example, may move to a location of the virtual port 26, retrieve the data storage element from the virtual port 26, move to the actual port 28 and deliver the data storage element to the actual port 26.

Figure 3:
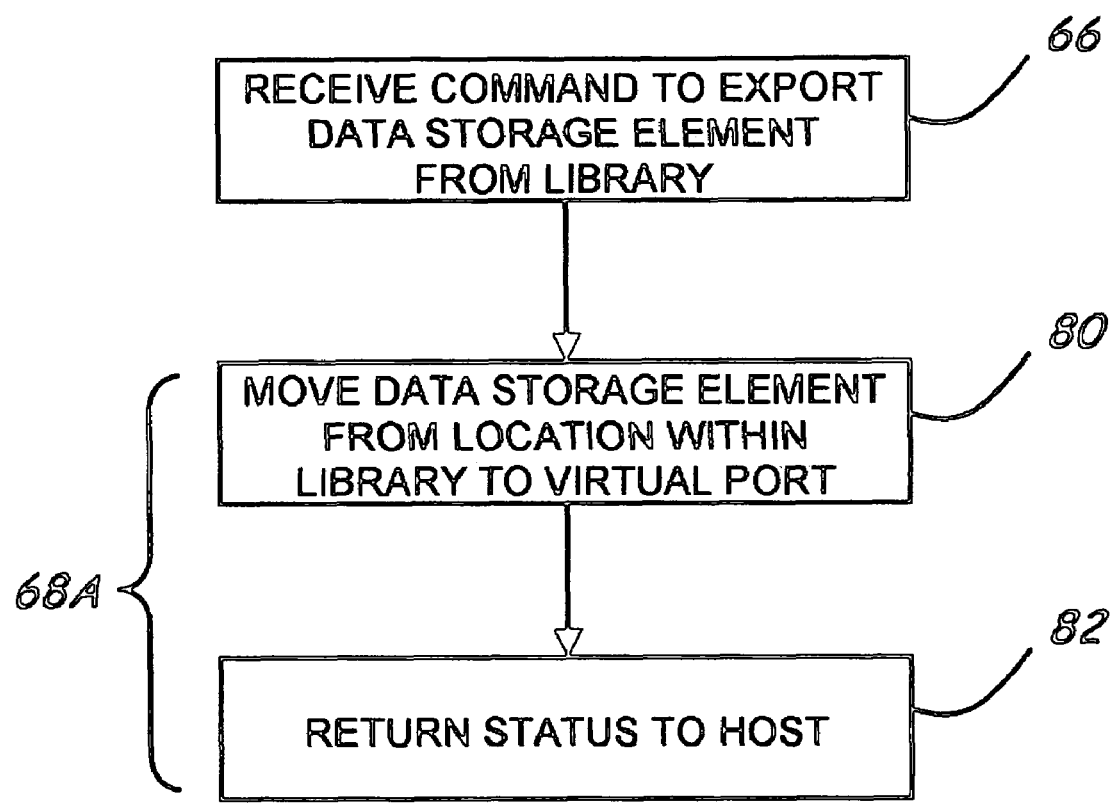
FIG. 3 shows a flow diagram of a first embodiment of a method of performing the operation of moving a data storage element from a location within the library to a virtual port of FIG. 2 as a foreground operation.

FIG. 3 shows a method 68A of performing the moving operation 68 of FIG. 2 in the foreground of the library 20. As shown in FIG. 3 and described above with reference to FIG. 2, a command to export a data storage element from the library 20 is received in operation 66. In response to this command, the data storage element is moved from a location of the library to the virtual port 26. In the embodiment shown in FIG. 3, the data storage element is moved to the virtual port 26 as a foreground move of the library 20 in operation 68A. In one embodiment, the controller 32 receives the command from the host computer 50. The controller 32 directs the transport unit 30 to retrieve the data storage element from a location within the library 20, such as from a storage location 22 or a data transfer interface 24, move from the location to the virtual port 26 and deliver the data storage element to the virtual port 26. If the move is successfully completed, the controller returns a successful status (e.g., STATUS=GOOD) to the host computer 50 indicating that the move requested by the host computer 50 was successfully performed. If the move was unsuccessful, however, the controller 32 returns an unsuccessful status (e.g., STATUS=CHECK STATUS) to the host computer 50 indicating that the move requested by the host computer 50 was not successfully performed.

Figure 4A:
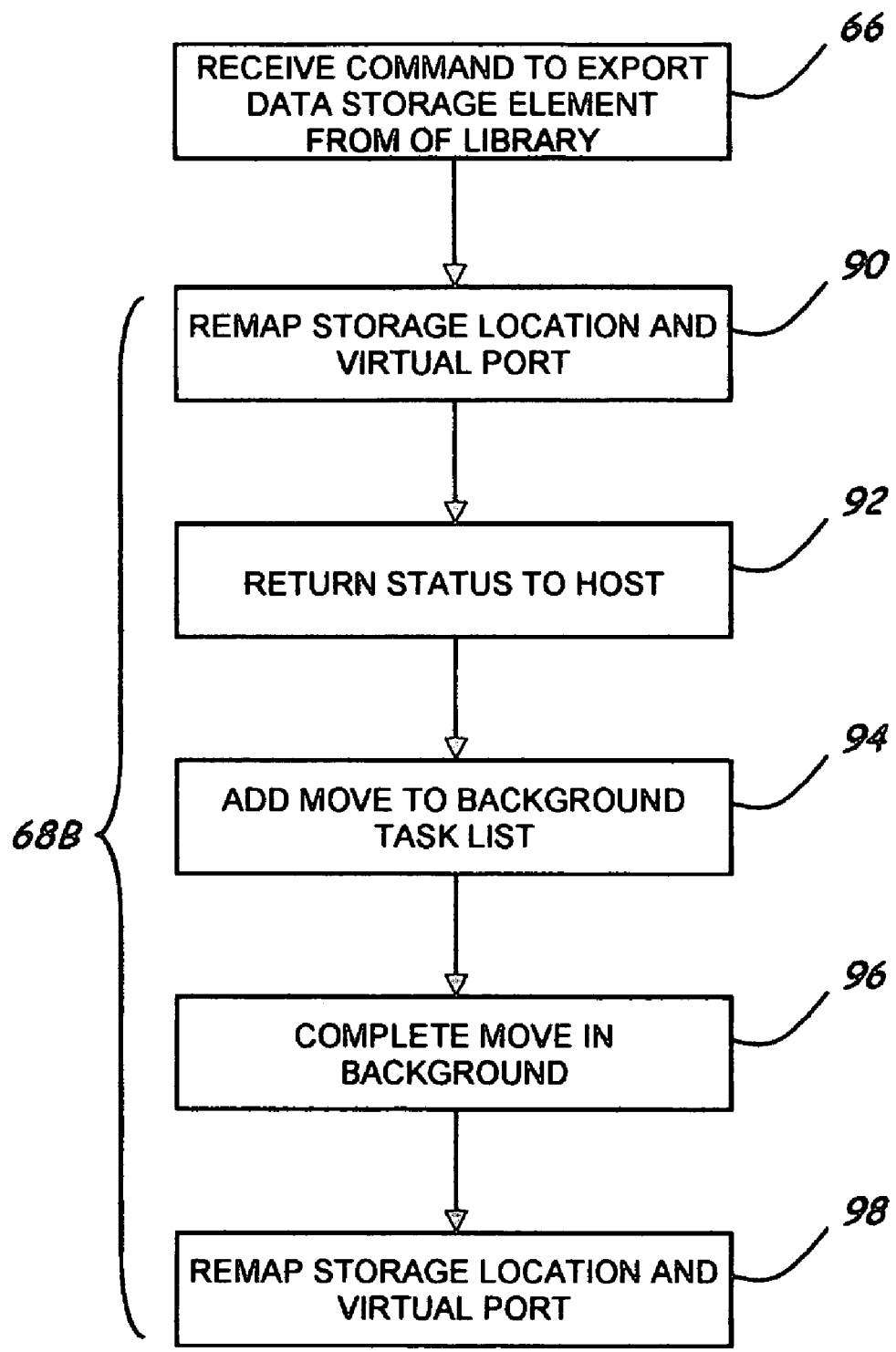
FIG. 4A shows a flow diagram of a second embodiment of a method of performing the operation of moving a data storage element from a location within the library to a virtual port of FIG. 2 as a background operation.

FIG. 4A shows an alternative method 68B of performing the moving operation 68 of FIG. 2 in the background of the library 20. As shown in FIG. 4A and described above with reference to FIG. 2, a command to export a data storage element from the library 20 is received in operation 66. In response to this command, the data storage element is moved from a location of the library to the virtual port 26. In the embodiment shown in FIG. 4A, the data storage element is moved to the virtual port 26 as a background move of the library 20 in operation 68B. In one embodiment, the controller 32 receives the command from the host computer 50 to export the data storage element from a storage location 22 of the library 20. In this embodiment, the controller 32 remaps the pointers identifying the storage location 22 and the virtual port 26 in operation 90 so that the host computer 50 perceives the storage location 22 where the data storage element resides as an actual port. The controller then returns a successful status (e.g., STATUS=GOOD) in operation 92 indicating that the move requested by the host computer 50 was successfully performed. The controller then adds the move to a background task list in operation 94. The background task list, for example, may be performed during idle time periods when the library is not performing operations under control of a host computer. The background tasks need not be performed over a single idle time period, but may be performed over multiple idle time periods spread across library operations being performed under the control of a host computer. During a background move, therefore, a library is in an operational state in which it is also available to perform library operations under the control of a host computer. During an idle time period of the library 20, the data storage element is moved from a storage location 22 to the virtual port 26 in operation 96. When the move is completed, the controller 32 remaps the pointers for the storage location 22 and the virtual port 26 to return the pointers to their original locations.

Figure 4B:
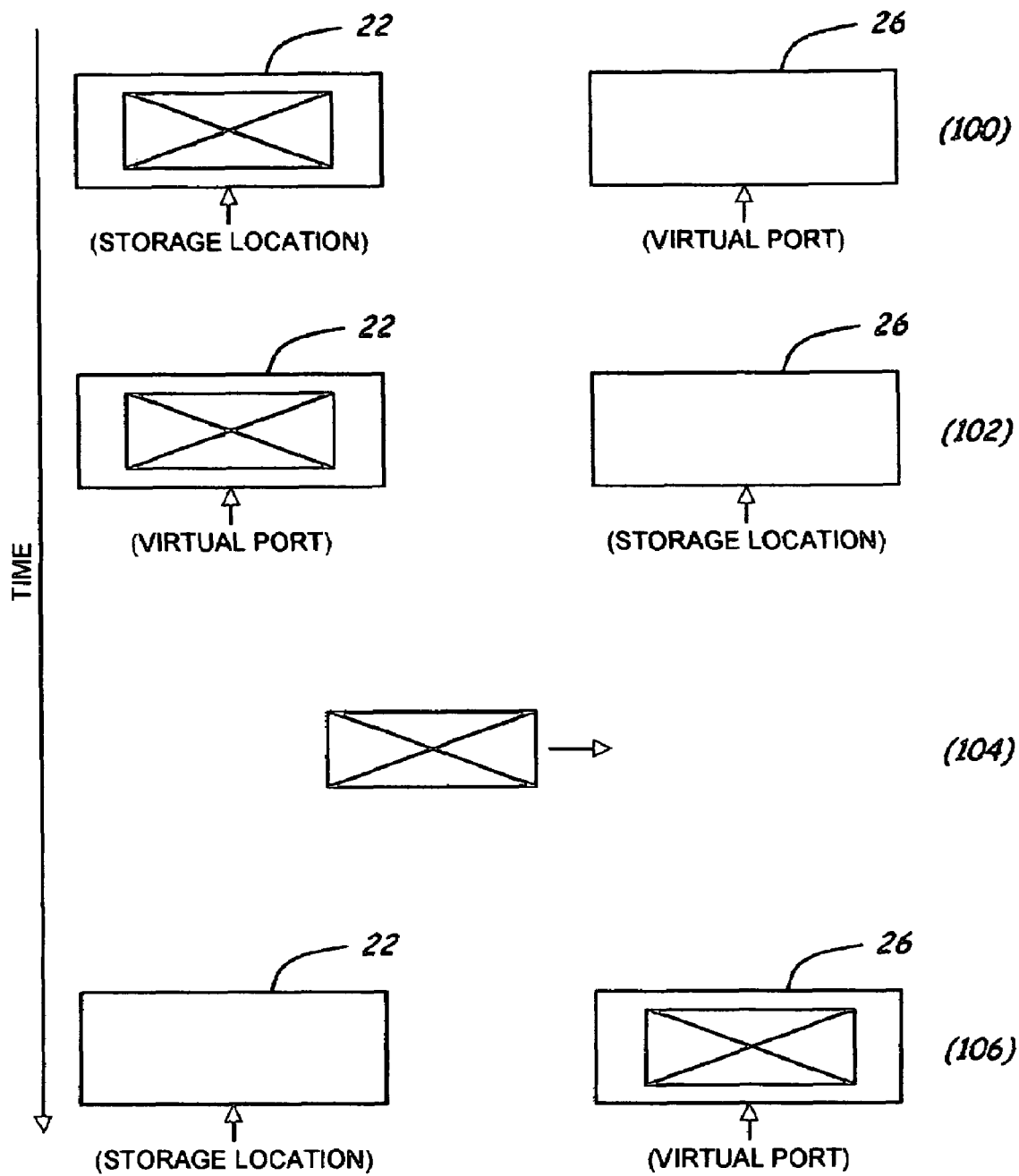
FIG. 4B shows a timing diagram of the method of performing the operation of FIG. 4A.

FIG. 4B, for example, shows a timing diagram of the operation 68B of FIG. 4A in which a data storage element is moved from a storage location 22 to the virtual port 26 in the background of the library 20. In operation 100, for example, the data storage element is shown residing in the storage location 22 ready to be moved to an empty location of the virtual port 26. At this time, the pointers for the storage location 22 and the virtual port 26 are shown pointing to their respective locations. Because the move is to be tasked to be moved in the background after the host computer 50 is informed that the move is complete, the pointers are swapped in operation 102. Thus, until the move is complete, the host computer 50 will not attempt to move another data storage element to the storage location that still has the data storage element to be moved because the host computer 50 perceives the storage location 22 to be the actual port to which the data storage element has already been moved. If the host computer 50 does move another data storage element into the location of the virtual port 26 before the move is completed, the library 20, preferably includes at least one housekeeping location (e.g., on the transport unit or one of the storage locations 22) to permit the two data storage elements to be swapped when the data storage element is moved in the background from the storage location 22 to the virtual port 26 in operation 104. After the move is complete, the controller 32 returns the pointers for the storage location 22 and the virtual port 26 to their original positions in operation 106.

Figure 5:
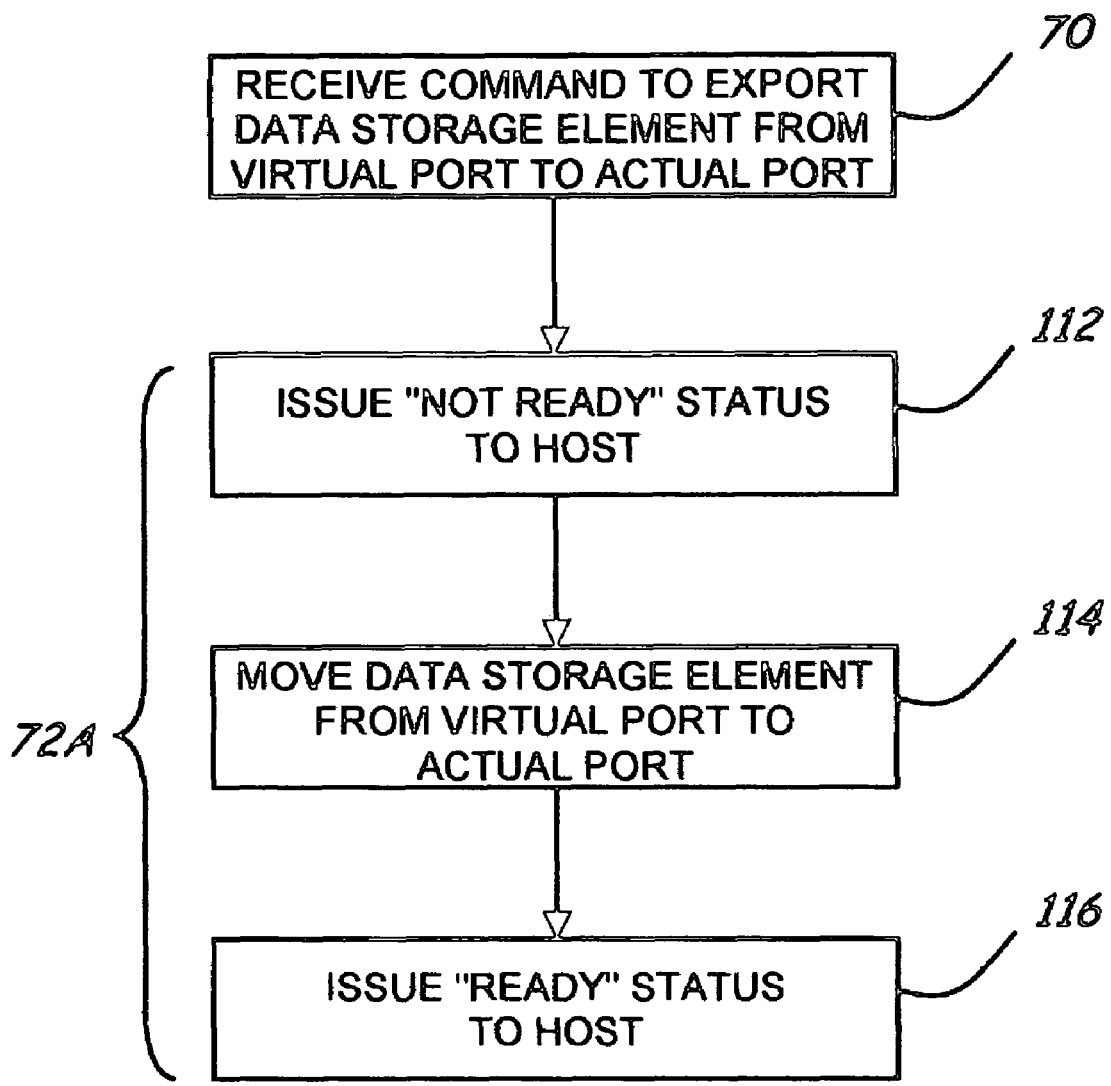
FIG. 5 shows a flow diagram of a first embodiment of a method of performing the operation of moving a data storage element from a virtual port to an actual port of FIG. 2 as a foreground operation.

FIG. 5 shows a method 72A of performing the moving operation 72 of FIG. 2 in the foreground of the library 20. As shown in FIG. 5 and described above with reference to FIG. 2, a command to export a data storage element from the virtual port 26 of the library 20 is received in operation 70. In response to this command, the data storage element is moved from the virtual port 26 to the actual port 28. In the embodiment shown in FIG. 5, the data storage element is moved from the virtual port 26 to the actual port 28 as a foreground move of the library 20 in operation 72A. In one embodiment, the controller 32 receives the command from an operator, such as via a control panel of the library 20. Because the controller 32 will control the operation of the transport unit 30 and to prevent a conflict between the controller 32 and the host computer 50, the controller issues a status (e.g., STATUS=NOT READY) to the host computer 50 indicating that the library 20 is off-line and inaccessible for operation under the control of the host computer 50 in operation 112. The controller 32 directs the transport unit 30 to retrieve the data storage element from the virtual port 26, move from the virtual port 26 to the actual port 26 and deliver the data storage element to the actual port 26 in operation 114. After the move is completed, the controller issues a status (e.g., STATUS=READY) to the host computer indicating that the library is ready back on-line and accessible for operation under the control of the host computer in operation 116. In one embodiment, upon coming back on-line, the host computer 50 will issue a request for an updated inventory and the controller 32 returns an updated inventory including the moves that were performed while the library was off-line. In an another embodiment, the controller 32 may provide an updated inventory to the host computer 50 when the controller 32 returns the library 20 to on-line operation.

Figure 6:
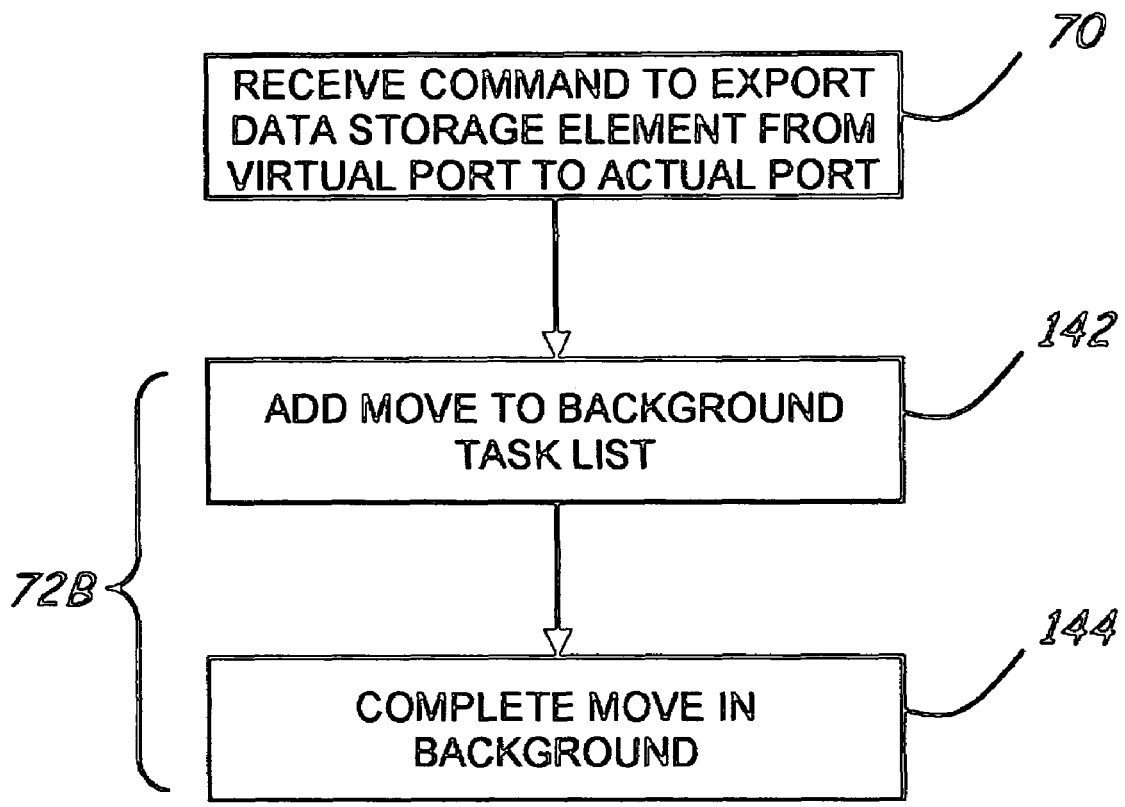
FIG. 6 shows a flow diagram of a second embodiment of a method of performing the operation of moving a data storage element from a virtual port to an actual port of FIG. 2 as a background operation.

FIG. 6 shows a method 72B of performing the moving operation 72 of FIG. 2 in the background of the library 20. As shown in FIG. 6 and described above with reference to FIG. 2, a command to export a data storage element from the virtual port 26 of the library 20 is received in operation 70. In response to this command, the data storage element is moved from the virtual port 26 to the actual port 28. In the embodiment shown in FIG. 6, the data storage element is moved from the virtual port 26 to the actual port 28 as a background move of the library 20 in operation 72B. In one embodiment, the controller 32 receives the command from an operator, such as via a control panel of the library 20. The controller 32 adds the move to a background task list in operation 142. During an idle time period of the library 20, the controller 32 directs the transport unit 30 to perform the move in operation 144.

Figure 7:
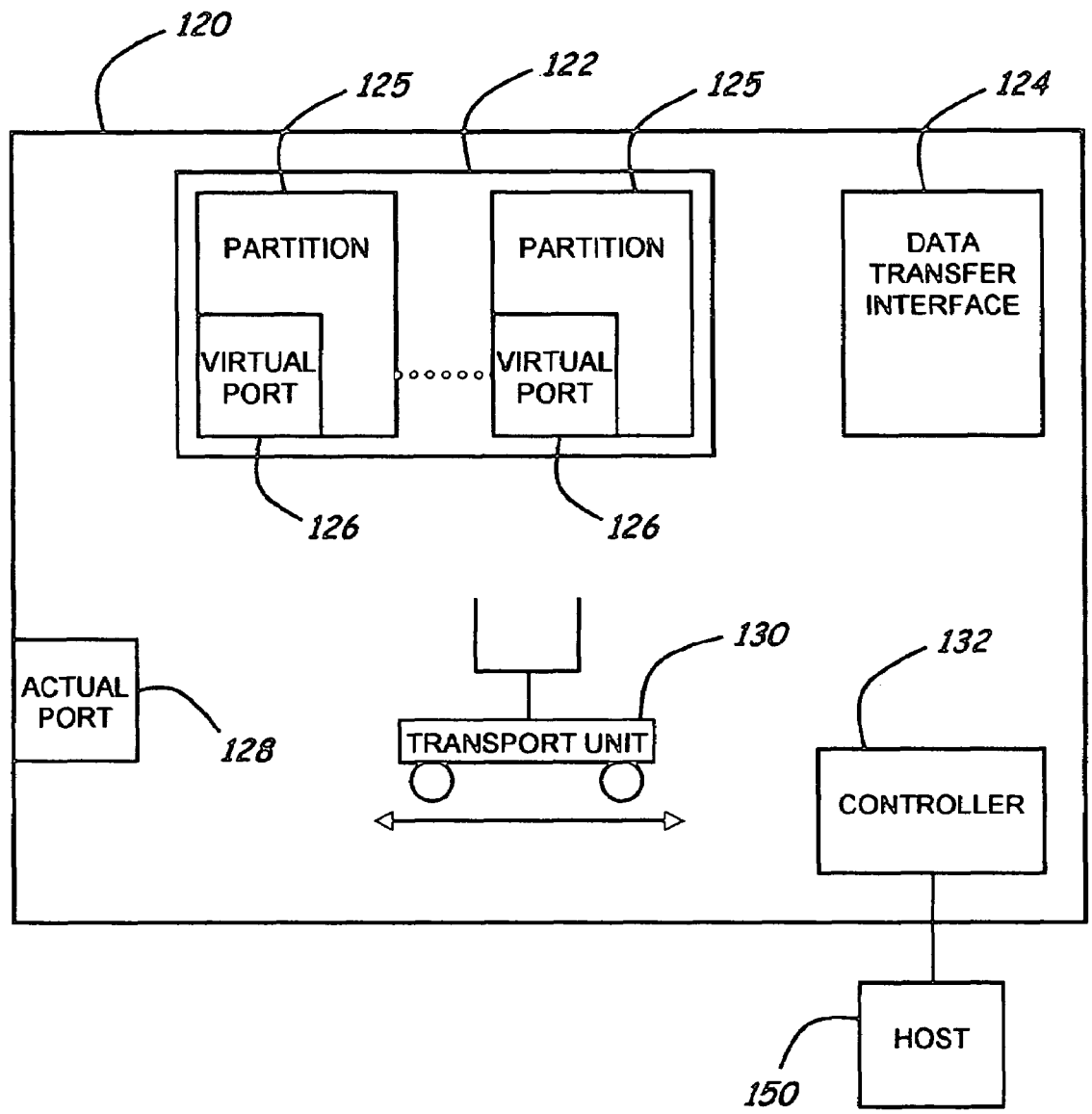
FIG. 7 shows a block diagram of second embodiment of a robotic data storage library.

FIG. 7 shows a block diagram of second embodiment of a robotic data storage library 120. The library 120 comprises a plurality of storage locations 122, a data transfer interface 124, an actual port 128, a transport unit 130 and a controller 132. The plurality of storage locations 122 further comprises a plurality of partitions 125 and a plurality of virtual ports 126. In one embodiment, each partition 125 comprises a virtual port 126. The virtual port 126 for each partition 125 may, as shown in FIG. 7, reside within the partition 125 to which it is assigned (logically or physically) or may reside external to the partition to which it is assigned. In either embodiment, the virtual ports 126 are assigned exclusively to their respective partitions 125. Thus, a host computer 150 assigned to a first partition will not access the virtual port of a second partition assigned to a second host, and vice versa.

Figure 8:
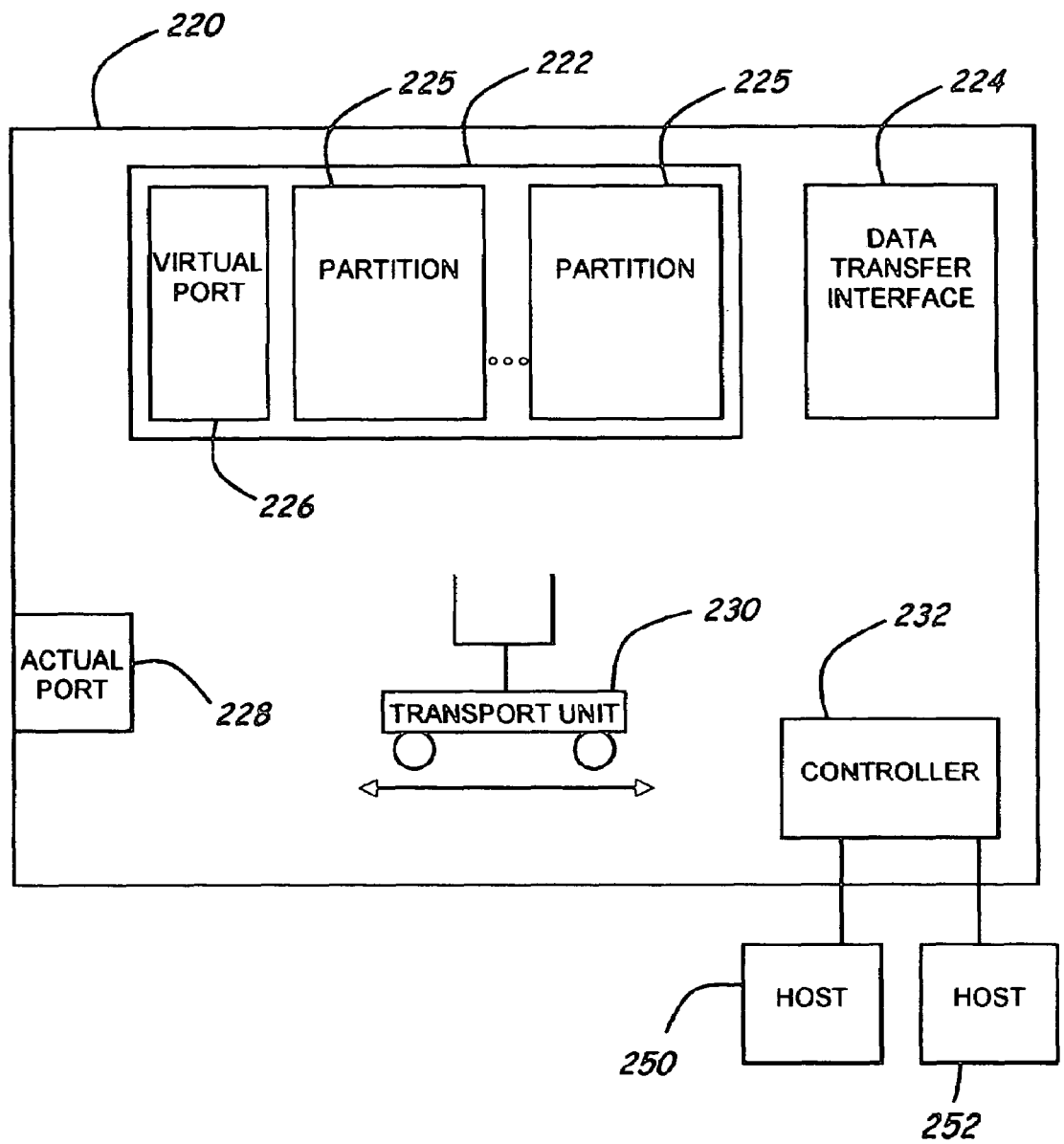
FIG. 8 shows a block diagram of a third embodiment of a robotic data storage library.

FIG. 8 shows a block diagram of a third embodiment of a robotic data storage library 220. The library 220 comprises a plurality of storage locations 222, a data transfer interface 224, an actual port 228, a transport unit 230 and a controller 232. The plurality of storage locations 222 further comprises a plurality of partitions 225 and a virtual port 226 provided for a plurality of partitions 225. The virtual port 226 for the library 220 may, as shown in FIG. 7, reside external to each partition 225 (logically or physically) or may reside internal to one of the partitions 225. In either embodiment, the virtual port 226 is assigned for a plurality of partitions 225. In an embodiment where a first host computer 250 is assigned to a first partition and a second host computer 252 is assigned to a second partition, the virtual port 226 may be accessed under the control of both host computers 250 and 252. In an embodiment in which the host computers 250 and 252 do not include peer-to-peer communication capabilities or for which peer-to-peer communication with respect to the inventory of the virtual port 226 is not desired, the controller 232 preferably maintains an inventory for the virtual port 226 and controls access to and from the virtual port 226 in order to prevent the host computers 250 and 252 from creating a conflict in the virtual port 226.

Figure 9:
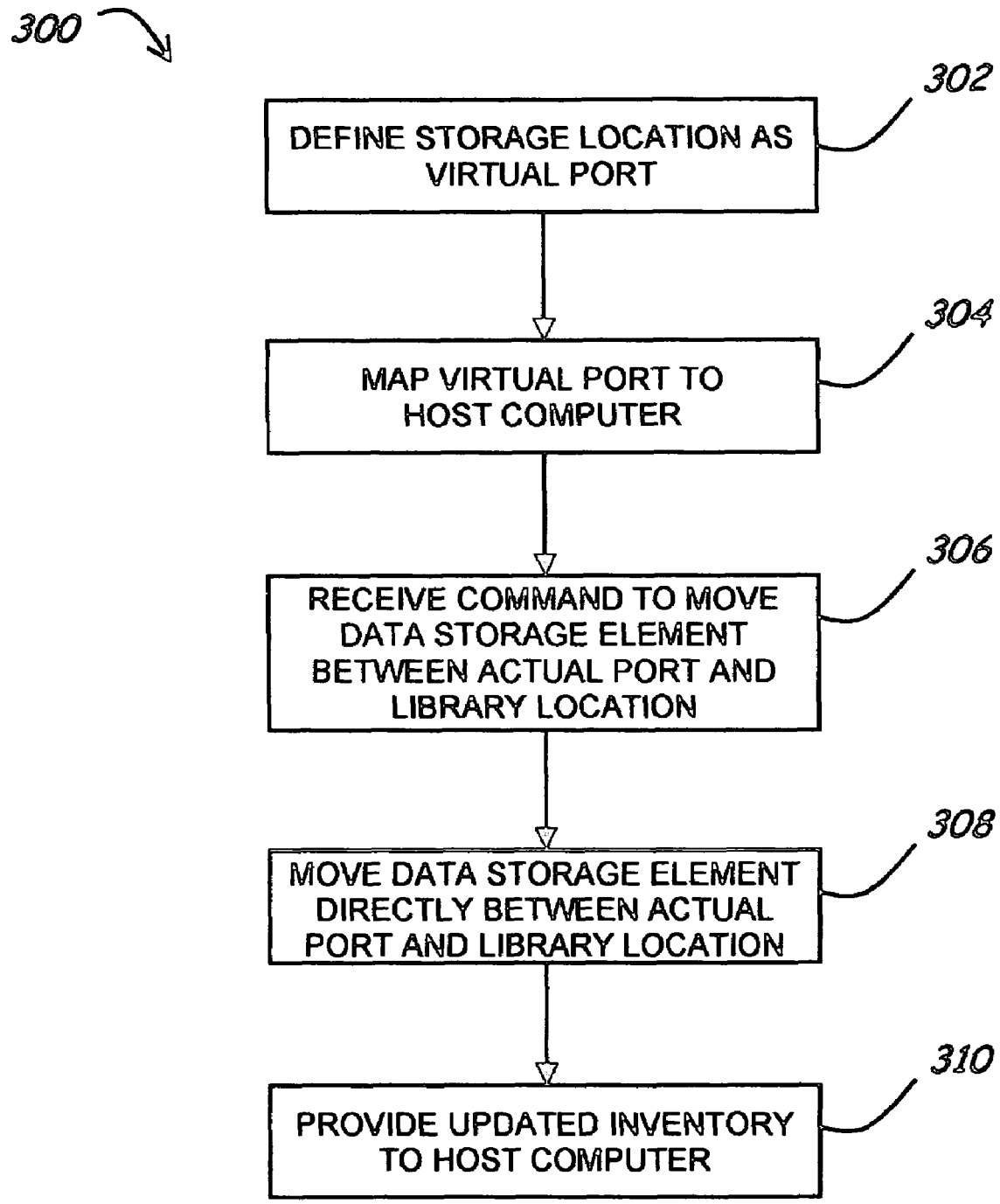
FIG. 9 shows a flow diagram of a method for loading data storage elements into and unloading data storage elements from a robotic data storage library.

FIG. 9 shows a method 300 for loading data storage elements into and unloading data storage elements from a robotic data storage library, such as the library 20 shown in FIG. 1. In the method 300, one or more storage locations 22 are defined as a virtual port 26 in operation 302 as described above with reference to FIG. 2. In operation 304, the virtual port 26 is mapped to a host computer 50 such that the host computer 50 perceives the virtual port 26 as an actual port. In one embodiment, the mapping operation 304 results in the host computer 50 perceiving a data storage element in the virtual port 26 as being located in an actual port and does not recognize a data storage element located in the actual port 28. Thus, moving a data storage element directly between the actual port 28 and a location within the library 20 other than the virtual port 26 may cause an error in an inventory being kept by the host computer because the host computer does not recognize the actual port 28. Thus a move to import a data storage element into or export a data storage element from the library 20 under the control of a host computer 50 generally requires a two-step move to maintain a consistent inventory for the host computer 50. During an import operation, for example, a data storage element is inserted into the actual port 26 at which point it is recognized by the controller 32. The controller 32 directs the transport unit 30 (either in the background or in the foreground as described above) to move the data storage element from the actual port 28 to the virtual port 26. The host computer 50 then recognizes the data storage element when it reaches the virtual port 26. The host computer 50 may then direct the transport unit 30 to move the data storage element to another location within the library 20, such as a storage location 22 or a data transfer interface 24, and update its inventory to account for the data storage element. In an export operation, for example, the host computer directs the transport unit 30 to move the data storage element to the virtual port 26 at which point the host computer 50 perceives the data storage element as residing in an actual port. Upon receiving a command, such as from an operator, the controller 32 directs the transport unit 30 to deliver the data storage element to the actual port 28 for removal from the library 20.

Method 300, however, provides the capability of performing a single step import or export operation between the actual port and another location within the library while still being able to maintain the inventory in the host computer 50 for a library 20 comprising one or more storage locations 22 defined as a virtual port 26 and mapped to a host computer 50 such that the host computer 50 perceives the virtual port 26 as an actual port. In operation 302, for example, one or more storage locations 22 are defined as a virtual port 26 as described above with reference to FIG. 2. The virtual port 26 is mapped to the host computer 50 in operation 304 such that the host computer 50 perceives the virtual port 26 as an actual port.

In operation 306, a command is received to move the data storage element between the actual port 28 and a location within the library other than the virtual port 26, such as a storage location 22. The command may be received, for example, by the controller 32 from an operator. The operator may provide the command via a control panel of the library, software running on the host computer 50, software running on a computer in communication with the controller, such as via a network, or via any other input to the controller 32. In response to the received command, the controller directs the transport unit to move the data storage element directly between the actual port and the location within the library. The data storage element may be moved as a foreground operation or as a background operation.

An inventory of the library is updated based upon the move performed by the transport unit 30. The inventory may be updated, for example, in anticipation of the move being performed, simultaneously with the move being performed or after the move is performed. The updated inventory is then provided to the host computer in operation 310. The controller 32 may issue a message to the host computer 50 to trigger the host computer 50 to request an updated inventory. In one embodiment, for example, the controller 32 may issue a DOOR OPEN message followed by a DOOR CLOSED message. In response the host computer 50 will typically request an updated inventory from the controller 32. Alternatively, the controller 32 may provide the updated inventory directly to the host computer 50. Thus, the method 300 allows for a single step move to import or export one or more data storage elements to or from a location within the library while maintaining an accurate inventory for the host computer 50.

Figure 10:
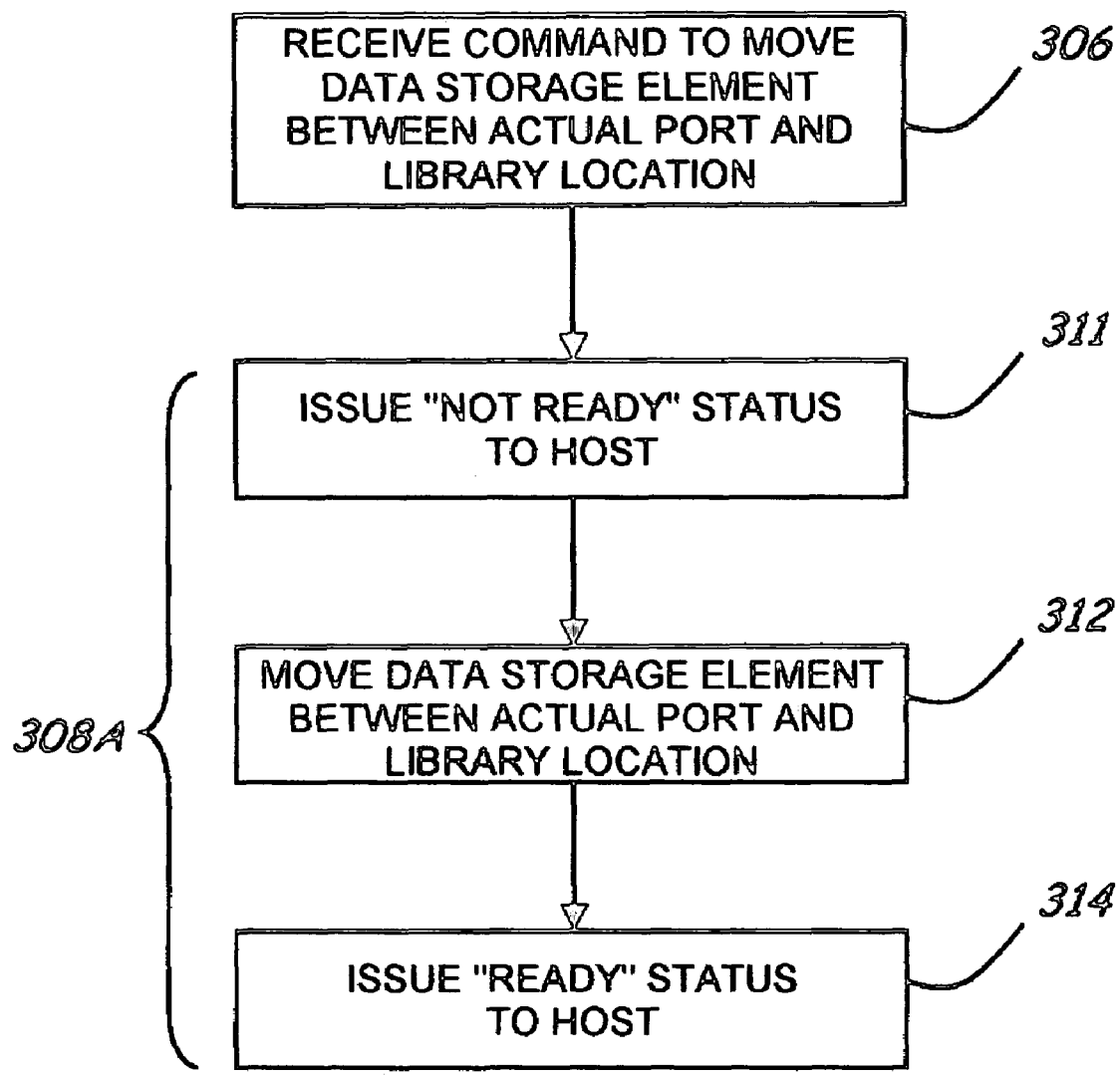
FIG. 10 shows a flow diagram of a first embodiment of a method of performing the operation of moving a data storage element directly between the actual port and a location within the library of FIG. 9 as a foreground operation.

FIG. 10 shows a flow diagram of an embodiment of a method 308A for performing the move operation 308 of FIG. 9 in the foreground of a library 20. A command is received to move a data storage element between an actual port and a location within the library 20, such as a storage location 22, in operation 306 as described with reference to FIG. 9. In one embodiment, for example, the controller 32 receives the command from an operator, such as via a control panel of the library 20. Because the controller 32 will control the operation of the transport unit 30 and to prevent a conflict between the controller 32 and the host computer 50, the controller issues a status (e.g., STATUS=NOT READY) to the host computer 50 indicating that the library 20 is off-line and inaccessible for operation under the control of the host computer 50 in operation 311. The controller 32 directs the transport unit 30 to move the data storage element between the actual port 28 and the location within the library 20 in operation 312. After the move is completed, the controller issues a status (e.g., STATUS=READY) to the host computer indicating that the library 20 is ready back on-line and accessible for operation under the control of the host computer in operation 314.

Figure 11:
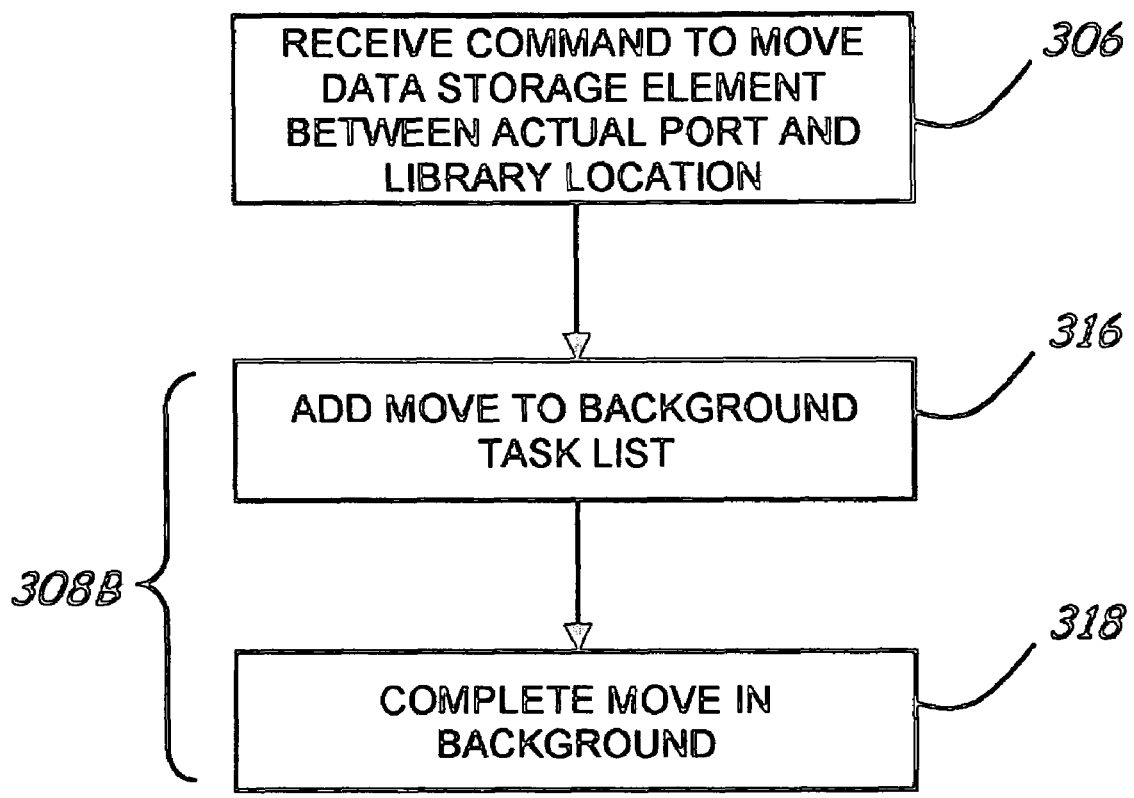
FIG. 11 shows a flow diagram of a second embodiment of a method of performing the operation of moving a data storage element directly between the actual port and a location within the library of FIG. 9 as a background operation.

FIG. 11 shows a flow diagram of an embodiment of a method 308B for performing the move operation 308 of FIG. 9 in the background of a library 20. A command is received to move a data storage element between an actual port and a location within the library 20, such as a storage location 22, in operation 306 as described with reference to FIG. 9. In one embodiment, for example, the controller 32 receives the command from an operator, such as via a control panel of the library 20. In this embodiment, the controller 32 adds the move to a background task list to be performed during an idle time period of the library in operation 316. During an idle time period, the controller 32 directs the transport unit 30 to move the data storage element between the actual port 28 and the location within the library 20 in operation 318.

Figure 12:
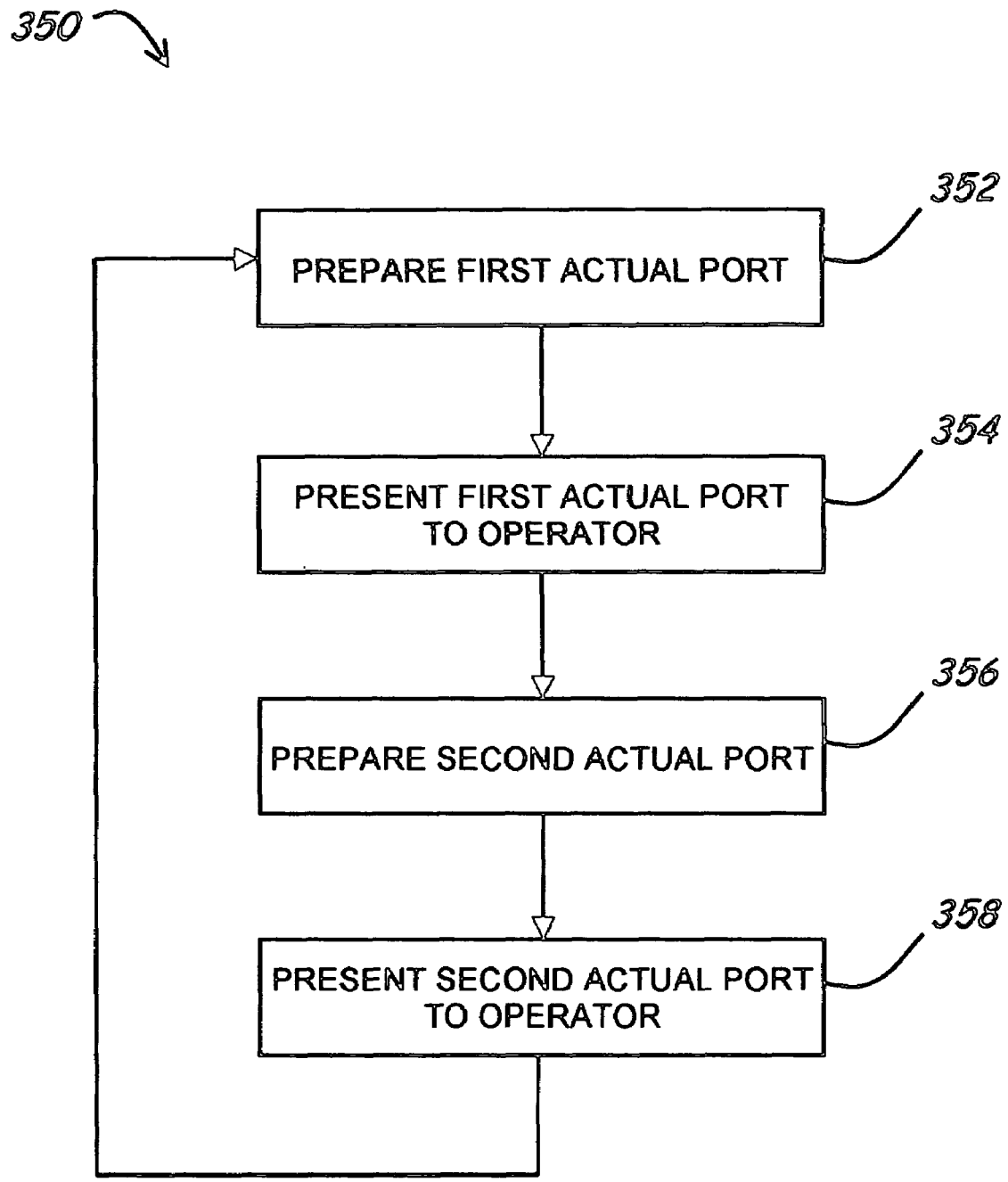
FIG. 12 shows a flow diagram of a method 350 for rapidly importing and/or exporting data storage elements into and/or from a robotic data storage library comprising a plurality of actual ports.

FIG. 12 shows a flow diagram of a method 350 for rapidly importing and/or exporting data storage elements into and/or from a robotic data storage library comprising a plurality of actual ports. In one embodiment, for example, the library comprises a first actual port and a second actual port. The actual ports may comprise an entry port for importing data storage elements into the library, an exit port for exporting data storage elements from the library and/or an entry/exit port for importing data storage elements into and exporting data storage elements from the library.

In the method 350, a first actual port is prepared in operation 352. In an export operation, for example, the first actual port is prepared by placing one or more data storage elements into the actual port from within the library for removal by an operator. In an import operation, however, the actual port is prepared by ensuring that the port comprises at least one location for receiving a data storage element from an operator. After the first actual port has been prepared, the port is presented to the operator in operation 354. An actual port may be presented, for example, by opening an outer door or otherwise placing the actual port in a state in which it is accessible by the operator. In an export operation, for example, an operator may retrieve one or more data storage elements from the port, while in an import operation, the operator may place one or more data storage elements into the actual port.

While the first actual port is accessible to the operator, the second actual port is prepared in operation 356. Thus, while an operator is removing data storage elements from or placing data storage elements into the first actual port, the second actual port is being prepared for the import and/or export operation in operation 356. After the second actual port is presented to the user in operation 358, the method 350 loops back to operation 352 to prepare the first actual port. The operations 352-358 may be repeated until the import and/or export operation is complete.

While the invention has been particularly shown and described with reference to a preferred embodiment thereof, it will be understood by those skilled in the art that various other changes in the form and details may be made without departing from the spirit and scope of the invention.

What is claimed is:

1. A robotic data storage library comprising:
a plurality of storage locations substantially comprised within said library wherein each of said storage locations is capable of holding at least one data storage element;
a data transfer interface adapted to establish a data transfer path between a host computer and said at least one data storage element;
an actual exit port capable of transferring said at least one data storage element out of said library;
a transport unit adapted to move said data storage element between said storage locations and between at least one of said storage locations and said actual exit port;
a controller capable of receiving an export command to export said at least one data storage element from said library;
at least one of said storage locations defined as a virtual exit port prior to receiving said export command wherein said virtual exit port is capable of receiving said at least one data storage element intended to be exported.

2. The robotic data storage library of claim 1 wherein said controller is further adapted to direct said transport unit to move said at least one data storage element from one of said plurality of storage locations to said virtual exit port.

3. The robotic data storage library of claim 1 wherein said controller is further adapted to direct said transport unit to move said at least one data storage element from said virtual exit port to said actual exit port.

4. The robotic data storage library of claim 1 wherein said controller further comprises a user interface for receiving a command to move said at least one data storage element from said virtual exit port to said actual exit port.

5. The robotic data storage library of claim 1 wherein said controller is further adapted to direct said transport unit to move said at least one data storage element directly from one of said plurality of storage locations to said actual exit port.

6. The robotic data storage library of claim 1 wherein said controller further comprises a user interface for receiving a command to move said at least one data storage element directly from one of said plurality of storage locations to said actual exit port.

7. The robotic data storage library of claim 1 wherein said virtual exit port is located in a preferred location.

8. The robotic data storage library of claim 7 wherein said preferred location comprises at least one magazine storage location.

9. The robotic data storage library of claim 7 wherein said preferred location comprises a plurality of contiguous storage locations.

10. The robotic data storage library of claim 7 wherein said preferred location comprises at least one of said storage locations located substantially adjacent to said actual exit port.

11. A robotic data storage library capable of performing the method steps of:
  receiving a first storage element export command from a host computer to transport at least one data storage element from a first storage location to an actual exit port wherein said library substantially contains at least said first storage location, a second storage location and a third storage location;
  designating said second storage location as a virtual exit port prior to receiving said first storage element export command wherein said virtual exit port is capable of receiving said at least one data storage element in response to said export command.

12. The method of claim 11 further comprising moving said at least one data storage element from said first storage location to said virtual exit port in response to said first storage element export command.

13. The method of claim 12 further comprising responding to said host that said export command has been carried out.

14. The method of claim 13 further comprising receiving a second storage element export command to transport said at least one data storage element from said virtual exit port to said actual exit port.

15. The method of claim 14 further comprising moving said at least one data storage element from said virtual exit port to said actual exit port in response to said second storage element export command.

16. The method of claim 15 further comprising exporting said at least one storage element out of said library.

17. The method of claim 11 further comprising receiving a second storage element export command to transport a second data storage element from said third storage location to said actual exit port.

18. The method of claim 17 wherein said third storage location is designated as a second virtual exit port.

19. The method of claim 11 wherein said step of defining said virtual exit port is performed via a device selected from the group consisting of: a control panel, a host computer and a controller of said library.

20. The method of claim 11 wherein said defining said virtual exit port comprises at least one preferred location selected from the group consisting of: at least one storage location in a magazine, a plurality of contiguous storage locations, a storage location located closest to said actual exit port, a storage location located substantially adjacent to said actual exit port, and at least one default storage location as said virtual exit port.

21. A robotic data storage library capable of performing the method steps comprising:
  receiving a first storage element export command from a host computer to transport at least one data storage element from a first storage location to an actual exit port wherein said first storage location is one of a plurality of storage locations substantially comprised within said library;
  designating at least a second storage location as a virtual exit port prior to receiving said first storage element export command wherein said virtual exit port is capable of receiving said at least one data storage element in response to said export command;
  responding to said host that said export command has been carried out;
  receiving a second storage element export command to transport said at one storage element out of said library;
  moving said at least one storage element out of said library in response to said second export command.

* * * * *